US 9,098,290 B2

(12) United States Patent
Chithambaram et al.

(10) Patent No.: US 9,098,290 B2
(45) Date of Patent: Aug. 4, 2015

(54) METHOD AND APPARATUS FOR FACILITATING DIAGNOSTIC LOGGING FOR SOFTWARE COMPONENTS

(75) Inventors: Nemmara Chithambaram, Novato, CA (US); Jeffrey M. Collins, San Mateo, CA (US); Deepak Goel, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 1647 days.

(21) Appl. No.: 12/022,876

(22) Filed: Jan. 30, 2008

(65) Prior Publication Data

US 2009/0193397 A1    Jul. 30, 2009

(51) Int. Cl.
*G06F 9/44*    (2006.01)
*G06F 17/40*    (2006.01)
*G06F 11/36*    (2006.01)
*G06F 11/34*    (2006.01)

(52) U.S. Cl.
CPC .......... *G06F 8/35* (2013.01); *G06F 11/366* (2013.01); *G06F 11/3476* (2013.01)

(58) Field of Classification Search
None
See application file for complete search history.

(56) References Cited

U.S. PATENT DOCUMENTS

| | | | | |
|---|---|---|---|---|
| 5,950,006 | A * | 9/1999 | Crater et al. | 717/140 |
| 6,018,627 | A * | 1/2000 | Iyengar et al. | 717/103 |
| 6,041,347 | A * | 3/2000 | Harsham et al. | 709/220 |
| 6,757,690 | B2 * | 6/2004 | Aldrich et al. | 707/702 |
| 6,877,155 | B1 * | 4/2005 | Lindsey | 717/137 |
| 7,010,364 | B1 * | 3/2006 | Singh et al. | 702/179 |
| 7,404,175 | B2 * | 7/2008 | Lee et al. | 717/104 |
| 7,512,613 | B2 * | 3/2009 | Taitel | 707/999.101 |
| 7,895,568 | B1 * | 2/2011 | Goodwin et al. | 717/108 |
| 7,983,879 | B1 * | 7/2011 | Vetsch et al. | 703/2 |
| 2002/0107875 | A1 * | 8/2002 | Seliger et al. | 707/200 |
| 2002/0147763 | A1 * | 10/2002 | Lee et al. | 717/100 |
| 2004/0210578 | A1 * | 10/2004 | Taitel | 707/8 |
| 2006/0200806 | A1 * | 9/2006 | Tasinga | 717/128 |
| 2006/0212145 | A1 * | 9/2006 | Singh et al. | 700/83 |
| 2008/0052667 | A1 * | 2/2008 | Taitel | 717/106 |
| 2012/0042300 | A1 * | 2/2012 | Taitel | 717/106 |
| 2012/0072399 | A1 * | 3/2012 | Taitel et al. | 707/687 |

OTHER PUBLICATIONS

Kandé, Mohamed M., Jörg Kienzle and Alfred Strohmeier. "From AOP to UML: Towards an Aspect-Oriented Architectural Modeling Approach" Sep. 30-Oct. 4, 2002, Dresden, Germany. Published in: the Second International Workshop on Aspect-Oriented Modeling with UML, in conjunction with the Fifth International Conference on the Unified Modeling.*

(Continued)

*Primary Examiner* — Don Wong
*Assistant Examiner* — Erika Kretzmer
(74) *Attorney, Agent, or Firm* — Park, Vaughan, Fleming & Dowler LLP; Mark Spiller (57) ABSTRACT

One embodiment of the present invention provides a system that facilitates diagnostic logging for software components. During operation, the system receives program code for a software component that was generated from an object model, where a key attribute has been specified for the object model. During execution of the program code, the system detects when an instance of the key attribute for the object model is accessed, and attaches state associated with the instance to a thread context in the runtime environment. The system then appends this state to a log during a logging operation to facilitate discovering and analyzing program faults.

13 Claims, 7 Drawing Sheets

(56) References Cited

OTHER PUBLICATIONS

IBM. "IBM Terminology—terms T". Retrieved from www-01.ibm.com/software/globalization/terminology/t.html on Oct. 19, 2012. pp. 1-3.*

Eakman, G. "Strategies for Debugging Embedded Systems", 2000 Embedded Systems Programming, pp. 139-147.*

Hamoud Aljamaan, Timothy C. Lethbridge, Omar Badreddin, Geoffrey Guest, Andrew Forward. "Specifying Trace Directives for UML Attributes and State Machines" Jan. 2014. 2nd International Conference on Model-Driven Engineering and Software Development (MODELSWARD). Retrived ieeexplore.ieee.org on Mar. 12, 2015.*

* cited by examiner

FIG. 1

```
public class PayrollEngine {

@NDC
    private Company m_company = null;
    @NDC
    Private Employee m_employee = null;
    static Logger logger = Logger.getLogger(PayrollEngine.class);

@NDC
    public void service1() {

// regular business logic
        ...
        ...

if (PayrollApp.mdc) {
            MDC.put("Company", m_company);
            MDC.put("Employee", m_employee);
        } if (PayrollApp.ndc) {
            NDC.push("PayrollEngine.service1()");
            NDC.push("Company:" + m_company + " Employee: " + m_employee);
        }

//empty log entry that will ensure that MDC and
        //NDC context are written to the log
        logger.warn("")
    }
}
```

ANNOTATIONS ADDED DURING CODE GENERATION TO FLAG KEY ATTRIBUTES IN OBJECT MODEL
200

DEVELOPER-SPECIFIED BUSINESS LOGIC
202

CODE GENERATED TO PUSH STATE INTO THREADLOCAL CONTEXT
204

LOGGING CALL
206

| LOGGER | MESSAGE | THREAD | LOGGED STATE |
|---|---|---|---|
| TRIVIAL | SESSION AUTHENTICATED | MAIN | PAYROLLAPP.SERVICE1() SESSION:45890 |
| PAYROLLENGINE | ISSUE IN PAYROLLENGINE | MAIN | PAYROLLAPP.SERVICE1() SESSION:45891 PAYROLLENGINE.SERVICE(1) COMPANY:GLOBAL-CORP EMPLOYEEID: 103 |
| PAYROLLENGINE | ISSUE IN PAYROLLENGINE | MAIN | PAYROLLAPP.SERVICE1() SESSION:45891 PAYROLLENGINE.SERVICE(1) COMPANY:GLOBAL-CORP EMPLOYEEID: 103 |
| PAYROLLENGINE | ISSUE IN PAYROLLENGINE | MAIN | PAYROLLAPP.SERVICE1() SESSION:45891 PAYROLLENGINE.SERVICE(1) COMPANY:GLOBAL-CORP EMPLOYEEID: 103 |
| ... | | | |
| PAYROLLENGINE | ISSUE IN PAYROLLENGINE | MAIN | PAYROLLAPP.SERVICE1() SESSION:45891 PAYROLLENGINE.SERVICE(1) COMPANY:GLOBAL-CORP EMPLOYEEID: 103 |
| PAYROLLENGINE | ISSUE IN PAYROLLENGINE | MAIN | PAYROLLAPP.SERVICE1() SESSION:45890 PAYROLLENGINE.SERVICE(1) COMPANY:GLOBAL-CORP EMPLOYEEID: 101 |
| PAYROLLENGINE | PK: 1111 MISSING | MAIN | PAYROLLAPP.SERVICE1() SESSION:45890 PAYROLLENGINE.SERVICE(1) COMPANY:GLOBAL-CORP EMPLOYEEID: 101 FOUNDATION.SERVICE1() PK:11111 |
| PAYROLLENGINE | OOPS, DATABASE ACCESS FAILED | MAIN | PAYROLLAPP.SERVICE1() SESSION:45890 PAYROLLENGINE.SERVICE(1) COMPANY:GLOBAL-CORP EMPLOYEEID: 101 FOUNDATION.SERVICE1() PK:11111 |

EXEMPLARY DEVELOPER-GENERATED LOGS 400

MODEL-DRIVEN DIAGNOSTIC LOGGING STATE 402

NON-ERRORS 404
LOGGED WARNING 406
LOGGED ERROR 408

METHOD AND APPARATUS FOR FACILITATING DIAGNOSTIC LOGGING FOR SOFTWARE COMPONENTS

BACKGROUND

As computer technology has evolved, software systems have grown in sophistication to support a wide variety of applications and to provide a wide range of features. However, as software complexity increases, the task of debugging and supporting software has become increasingly more difficult. During the software development process, multiple software teams often simultaneously develop different software components which are integrated into a software product that spans a distributed network runtime environment. In such an environment, detecting software faults and determining the source of such faults can be extremely challenging, or even impossible.

Successful software development and support often depends on the ability to log information that can be used to re-create conditions that lead to software faults or unexpected results. However, the availability of such logging information depends on developers following best practices, which involves logging all relevant state and events to system and/or error logs. When developers fail to log the appropriate events and/or system state, the ability to troubleshoot problems is significantly reduced.

SUMMARY

One embodiment of the present invention provides a system that facilitates diagnostic logging for software components. During operation, the system receives program code for a software component that was generated from an object model, where a key attribute has been specified for the object model. During execution of the program code, the system detects when an instance of the key attribute for the object model is accessed, and attaches state associated with the instance to a thread context in the runtime environment. The system then appends this state to a log during a logging operation to facilitate discovering and analyzing program faults.

In some embodiments, specifying the key attribute in the object model facilitates automatically logging state associated with the key attribute during program execution.

In some embodiments, state for the instance is automatically included in the log, thereby facilitating diagnostic logging without requiring software developers to explicitly choose and/or include state to be included in the log. Automatically including such state information in the log improves the availability of logging information and the supportability of the program code.

In some embodiments, the system automatically includes state and execution trace information from the thread context whenever a logging operation occurs in the runtime environment.

In some embodiments, a logging operation can be triggered by a developer-initiated call to a log function and/or an entry point into an identified key service.

In some embodiments, multiple software components are developed simultaneously and independently for an integrated product, with key attributes specified in the object model of each respective software component. The system automatically attaches state associated with the multiple key attributes of the multiple software components to the thread context during program execution, and then writes this state to the log during logging operations. Hence, this technique facilitates seamless, integrated logging of state for the integrated product during program execution.

In some embodiments, a key attribute identifies key objects and/or key behaviors for an object model.

In some embodiments, the object model describes the structure and functionality of a software component using a standardized specification language.

In some embodiments, the system uses the log to detect program faults and/or program anomalies and to detect impending program failures.

In some embodiments, the system parses a log to find patterns that are indicative of healthy state, faults, and/or failures.

In some embodiments, the runtime environment is a distributed runtime environment that spans multiple computers, networks, and/or software components.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Model-Driven Software Development

In one embodiment of the present invention, software development begins with the design of an object model that specifies the high level data relationships and behaviors for a software component. In such "model-driven development," an object model may be created by a model developer in a standardized specification language, such as the Unified Modeling Language (UML). The resulting model (e.g., a UML diagram) forms the backbone structure of the future software component. For instance, such a model can specify the structure and type of data to be stored or transferred between client applications, as well as a set of operations that client applications might invoke.

In the next development stage, the system uses the object model to automatically generate a set of self-sufficient source code that can be used by the software component to access (e.g., read or write) structured data as defined by the object model. This generation step creates a base set of definitions and procedures for a working software component from the object model, which can then be extended and fleshed out by a software developer. This model-driven approach substantially benefits the design and implementation of reusable software components that can be used across a variety of different applications.

Often a number of such software components are combined into an integrated software product. Note, however, that when a collection of such software components are developed independently, a given software developer may not know at development time the context in which the software component will actually operate. Hence, the software developer may not know the appropriate level of logging support to include and provide either too much or too little logging support, which can result in later difficulties. For instance, insufficient logging support can result in reduced traceability in and supportability of the end product. Alternatively, too much log data can make finding the cause of a given issue extremely challenging. Determining and organizing an appropriate level of logging can be challenging for even the most diligent software developers, while some un-diligent software developers may not perform even a minimal level of logging. In summary, determining a "right" level of log availability which ensures that enough logging information is available to provide software supportability for a software component can be difficult.

One embodiment of the present invention automatically provides extensive, context-sensitive logging information for software components, without requiring additional software developer effort.

Diagnostic Logging Without Additional Software Developer Effort

In one embodiment of the present invention, the system uses key attributes specified in an object model to automatically generate program code for diagnostic logging. The system generates code that automatically logs accessed instances of such key attributes from within the generated program code without additional effort on the part of software developers.

In one embodiment of the present invention, a model developer identifies meta-properties (or key attributes) for a subset of objects and/or behaviors while designing an object model for a software component. For instance, the model developer may identify an object in a UML model as a key attribute, to ensure that accesses to and/or use of instances of this object will be logged during program execution. Hence, the system enables the model developer to provide "hints" to the software generation process of significant properties (e.g., key entity types) and/or behaviors that should be logged during program execution.

Figure 1:
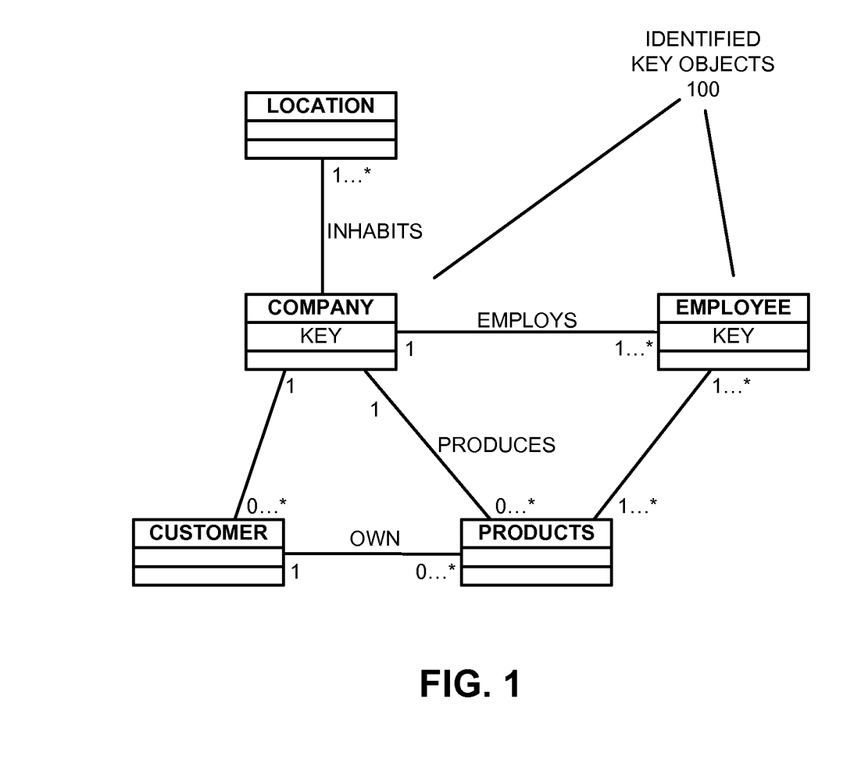
FIG. 1 illustrates a UML diagram in which objects have been identified as key attributes in accordance with an embodiment of the present invention.

FIG. 1 illustrates a UML diagram in which objects have been identified as key attributes. In FIG. 1, which illustrates a simple object model for an exemplary domain software component, the company object and the employee object both include meta-properties identifying them as key objects 100 whose instances should be included in logs when accessed.

In many business process environments, tasks follow a single thread of execution. In one embodiment of the present invention, the system generates program code that stores object state and/or other context information in the local context associated with a thread of execution (or "threadLocal context") during operation. During a call to a logging function, the system also writes the object state stored in the threadLocal context to the log. Note that the system can add object state and/or context information for multiple objects and behaviors into the threadLocal context as they are encountered during a transaction, thereby enabling the logging of rich context information that details the specific objects active during a transaction.

In one embodiment of the present invention, the system ensures that all state stored in the threadLocal context is logged every time a system- or developer-initiated logging event occurs. The context information of interest that has been stored in the threadLocal context can be automatically included during every call to a logging function, thereby providing a significant amount of semantic structure to the logs describing not only the time and user accessing objects, but also the actual objects being handled. This additional log information allows failures to be linked with specific business objects or functions, thereby concretely associating the logs with specific state in the software environment.

Note that the key service calls and states in such an environment are often known, and can be outfitted with either developer- and/or system-initiated calls to a logging function. For instance, during a developer-initiated call to a logging function, the system can prepend the state attached to the threadLocal context to the developer-specified log information to provide additional context information. Alternatively, the system, depending on the desired level of logging, can also be configured to generate code that makes additional calls to the logging function upon the access and/or creation of instances of key attributes specified in the object model. Furthermore, the system may automatically trigger a logging event at every entry point into an identified key service or function.

Figure 2:
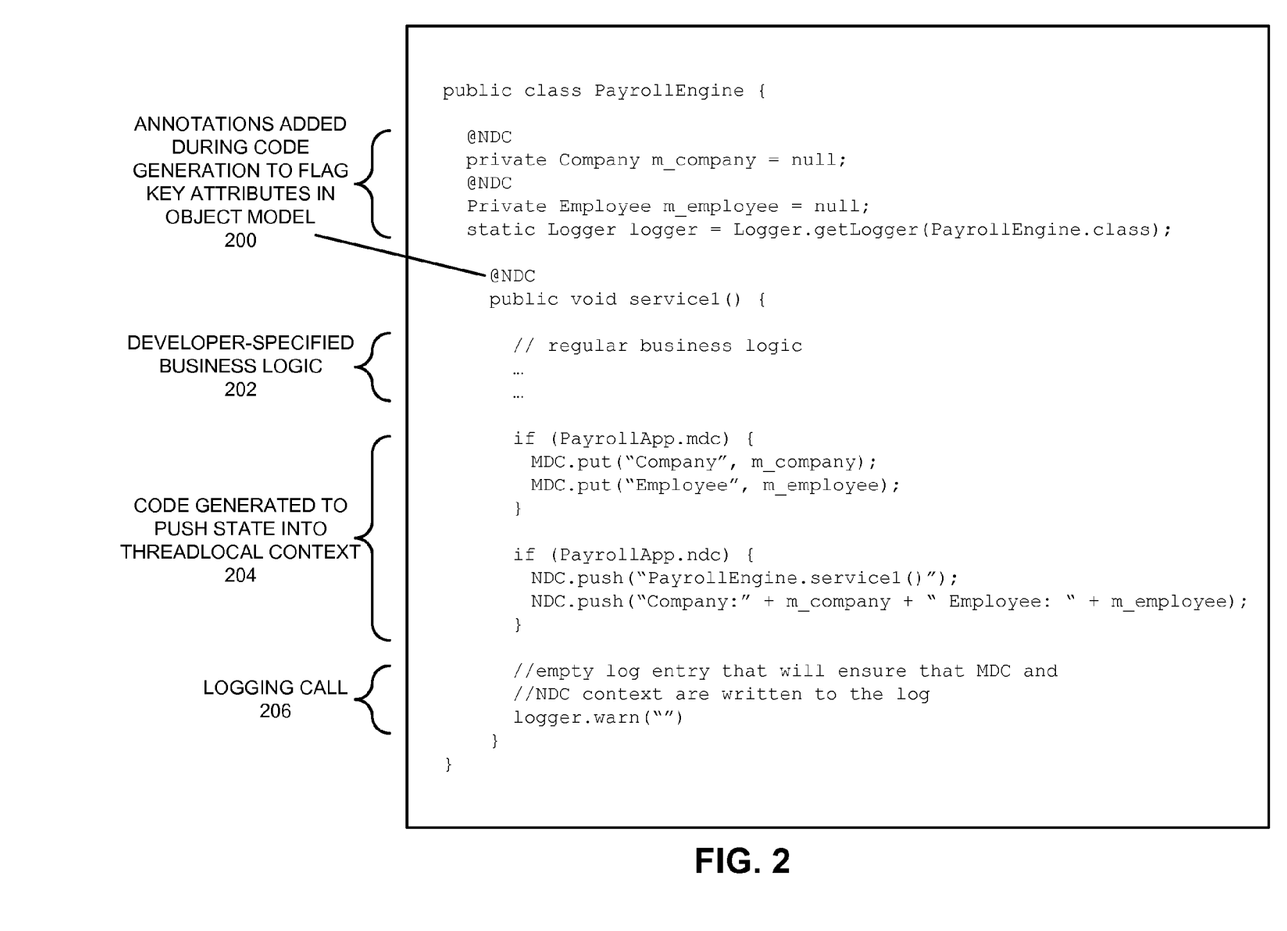
FIG. 2 illustrates exemplary code generated from an object model in which key attributes have been identified in accordance with an embodiment of the present invention.

FIG. 2 illustrates exemplary code generated from an object model in which key attributes have been identified. The system adds annotations (indicated by the "@NDC" in the illustrated code) during code generation to flag the key attributes specified in the object model 200. The system also generates code that automatically pushes state information into the threadLocal context 204, and then makes a logging call 206 ("logger.warn ("")") that writes the current state information into the log. Note that the final program code also includes additional developer-specified business logic 202. In the illustrated code, "MDC" is Mapped Diagnostic Context, or state that is output to the log as key-value pairs. Alternatively, Nested Diagnostic Context ("NDC") is nested state and/or context (such as a call history) that is output to the log.

Figure 3A:
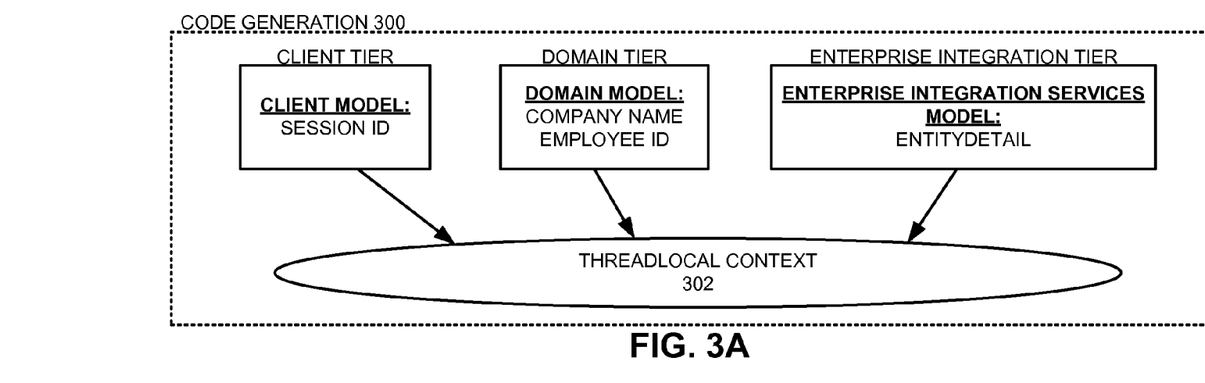
FIG. 3A illustrates aspects of code generation for a system that automatically logs context information in accordance with an embodiment of the present invention.

FIG. 3A illustrates aspects of code generation for a system that automatically logs context information. During code generation 300, the system generates code for three object models, specifically: (1) a client model; (2) a domain model; and (3) an enterprise integration services model. Key attributes for these three object models have already been identified by model developers prior to program code generation (e.g., a sessionID for the client model, a company name and employee ID for the domain model, and an entityDetail for the enterprise integration services model). The system-generated program code includes program code to add state related to instances of such key attributes to the threadLocal context 302 whenever such instances are accessed.

Figure 3B:
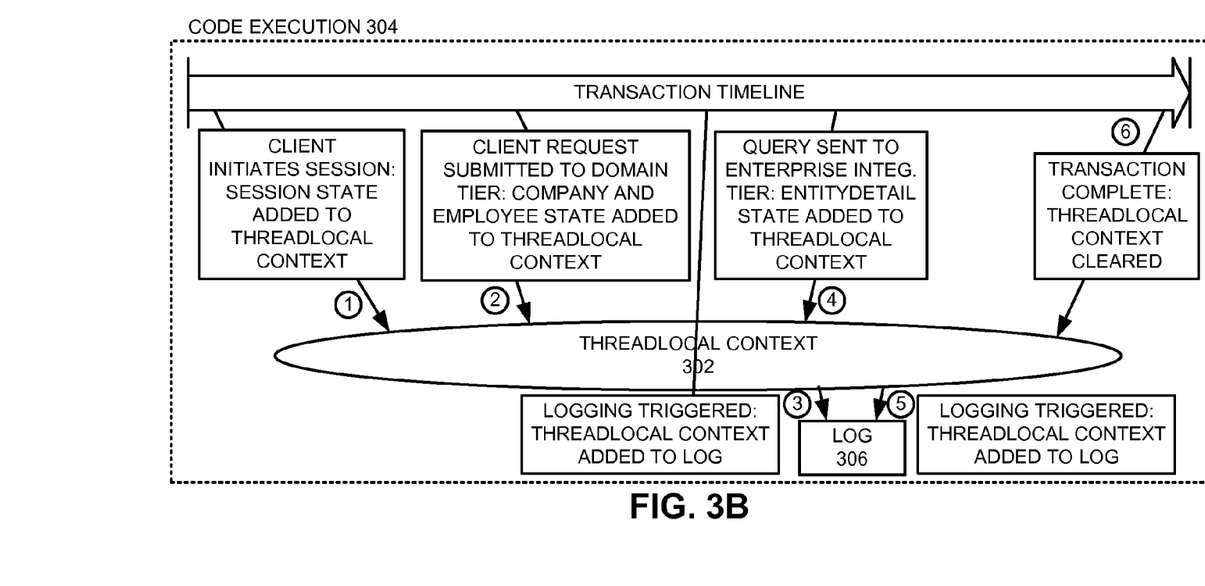
FIG. 3B illustrates aspects of code execution for a system that automatically logs context information in accordance with an embodiment of the present invention.

FIG. 3B illustrates aspects of code execution for a system that automatically logs context information. During code execution 304, when a client system initiates a transaction, program code generated by the system automatically adds state for an associated session ID to the threadLocal context 302 (operation 1). In the next step of the transaction, the client system submits a request relating to a given company name and employee ID to a domain tier software component, triggering the system to add state relating to the specified company and employee instances to be accessed to the threadLocal context 302 (operation 2). At this point, the threadLocal context 302 includes combined state for the given session, company, and employee, all of which the system writes into log 306 if a logging event is triggered (operation 3). As the transaction continues to execute, the domain tier formulates and sends a query to a third software component for the enterprise integration tier (operation 4), thereby prompting the allocation of an entityDetail object. The system detects the creation of a new instance a key object, and stores state for the entityDetail instance in the threadLocal context 302. If the execution of the query has been identified as a key service, a log event is triggered, and the system adds the contents of threadLocal context 302 (including state information for the stored session, company, employee, and entityDetail) to log 306, (operation 5). After the query has executed and the transaction has completed, the system clears the stored state, which is no longer needed, from threadLocal context 302 (operation 6). While the above example primarily describes storing object-related state, the system can also store execution trace information for key functions and/or behaviors in threadLocal context 302, and write such trace information to log 306.

Note that if an error occurs during the above transaction, the state information written to the log can be used to determine the point of failure. For instance, a support engineer examining log 306 in response to a customer support call may determine the session id for a web service request using a customer-supplied company name and employee id, and then use this information to find the associated entityDetail used for the query in the enterprise integration tier, or to trace all the key behavioral operations that succeeded and/or failed during the transaction. Based on the available logging information, the support engineer can determine how far the transaction progressed, and examine the included state to help determine the cause of the error.

Figure 4:
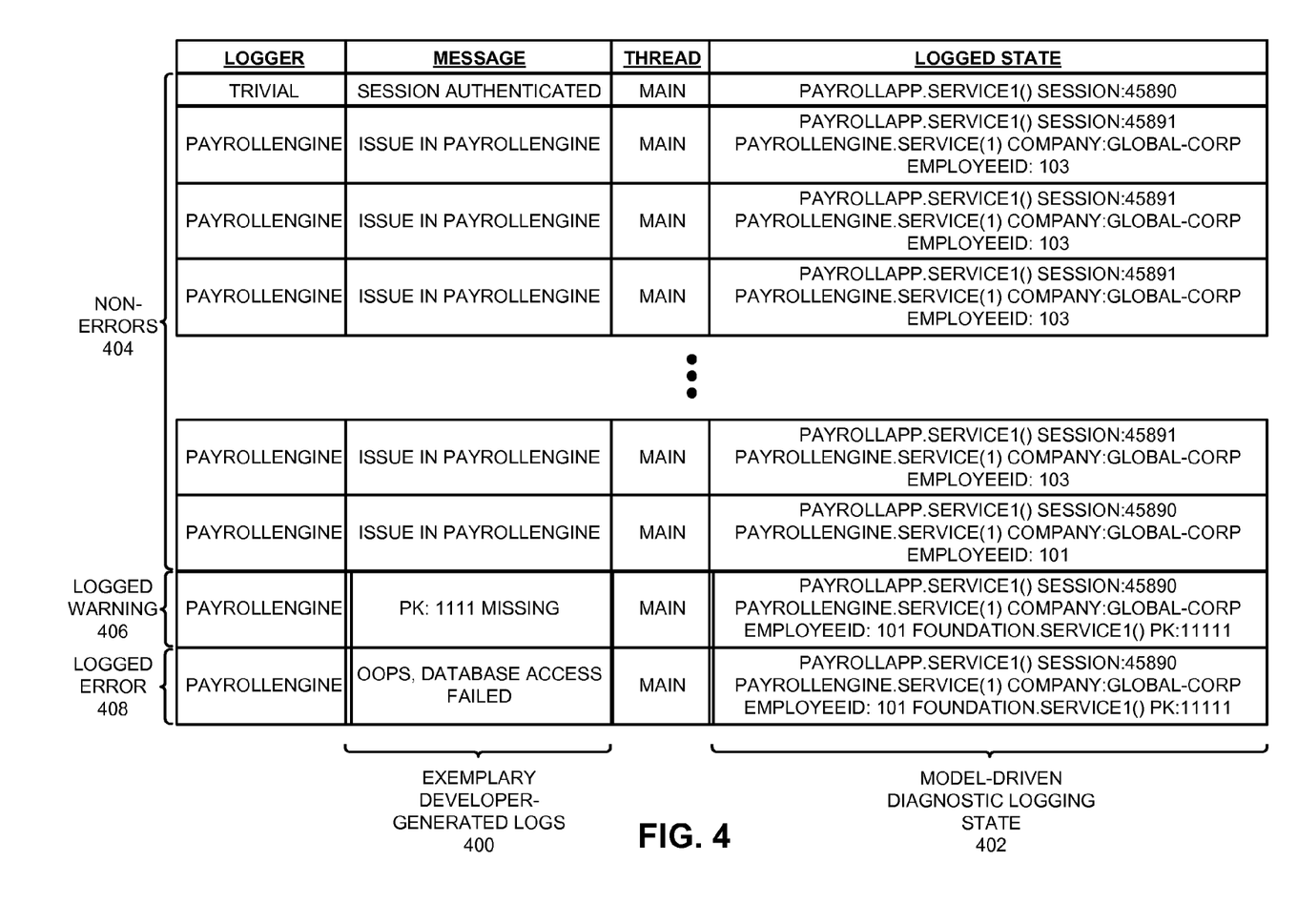
FIG. 4 illustrates exemplary log output in accordance with an embodiment of the present invention.

FIG. 4 illustrates exemplary log output for a scenario substantially similar to that described for FIGS. 3A-3B. In FIG. 4, high-level developer-generated log information 400 has been augmented with model-driven diagnostic logging state 402, which provides substantially more useful state information when a warning 406 or an error 408 is logged. A support engineer can also use logged non-error 404 state to re-construct scenarios in which an error spans a longer timeframe, such as the error 408 shown for session 45890 and employee ID 101. Note that the log output illustrated includes both MDC state (e.g., key-value pairs for session and employee ID) as well as NDC state (e.g., the names of function calls in a call trace).

Note also that the described techniques and logged state are not limited to determining or notifying errors, but can also be used to detect and resolve other non-failure issues of interest that arise during system operation. For instance, the additional logged state may be used to detect warnings, security breaches, and/or odd situations that may not be immediately appear to be problems, but are unusual enough to warrant further inspection. For example, logged data could be used to detect how and why a significantly excessive discount percentage was applied for a given transaction in a web-based point-of-sale system.

In some embodiments of the present invention, logged state information allows operations to be tracked back in time across every entity in a business enterprise. For instance, a customer may only find out a month after a bill-pay operation that was reported to be successful that the operation in truth actually failed, at which point the logs can be scanned to determine the cause (e.g., that a validating server was offline). In another example, a case of identity theft may only be detected 20 days after the fact, during a credit-card clearing operation. In this situation, rich logging state can be used to trace back actions in the system, so that investigators can detect which entries in the system were in play when the system was compromised, and determine information relating to the perpetrator. In some cases, a model developer may already identify useful key attributes that should be logged while developing the object model, to ensure that logged state is available for specific anticipated threats, such as identity theft. However, even if the model developer can not pre-predict interesting failure cases or potential program issues, identifying the key attributes of the object model can already provide additional useful log data that can be perused when unanticipated failures occur.

Simultaneous Independent Development

As mentioned previously, integrated logging infrastructure is especially important for the simultaneous development of software components that are to be integrated into a cohesive end-product. Quite often such end-products are applications executed in distributed network-based environments, which can be especially difficult to debug and support due to a wider range of reliability and/or forensics issues. In such environments, the model-driven logging approach described above can be especially beneficial, because the techniques used during the modeling and code generation process are uniform and involve minimal additional effort. If the independent development teams each individually define a respective initial object model with identified key attributes, each team can use different software development techniques and logging practices, and yet the results output by the final integrated product will still appear fairly uniform. Hence, the described techniques can be used to provide seamless, structured log generation across an entire enterprise, so that from the viewpoint of a product support team the final product appears to have been written by a single development team using a canonical object model.

In one embodiment of the present invention, the described techniques can be used in conjunction with additional developer logging. Each model team remains able to choose additional significant data and/or behavior to be logged, with the primary difference being that the same logging function invocations also output additional state information for instances of key attributes during the logging process. For instance, the automatic coverage provided by the model-driven logging system may provide automatic coverage for the majority of logging needs, with developers adding some additional logging statements to cover special cases or to pinpoint specific additional operations of interest.

Note that the described model-driven logging approach differs from other approaches. For instance, manual logging techniques are often much more manually intensive, with varied results. Similarly, attempting to glean application state by parsing and attempting to interpret message and protocol headers (e.g., HyperText Transport Protocol (HTTP) headers) can be extremely challenging. In contrast, the described techniques involve no additional developer effort and benefit from structured logs that are context-rich with business objects specifically identified as being important, thereby providing insight into system behavior.

Figure 5:
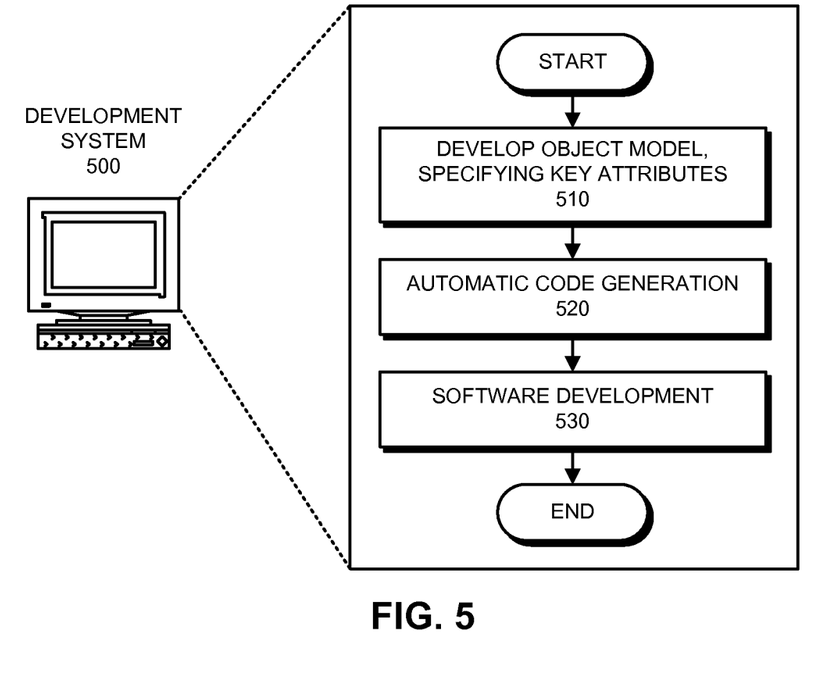
FIG. 5 presents a flow chart illustrating the model- and software-development process for a software component in accordance with an embodiment of the present invention.

FIG. 5 presents a flow chart illustrating the model- and software-development process for a software component. During development, one or more development systems 500 are used to develop an object model for the software component. During this development process, model developers specify key attributes in the object model (operation 510). The system then automatically generates a program code framework for the software component based on the object model, including specialized logging code that manages the logging of state for instances of the specified key attributes (operation 520). Next, the program code framework is fleshed out and completed by software developers (operation 530).

Figure 6:
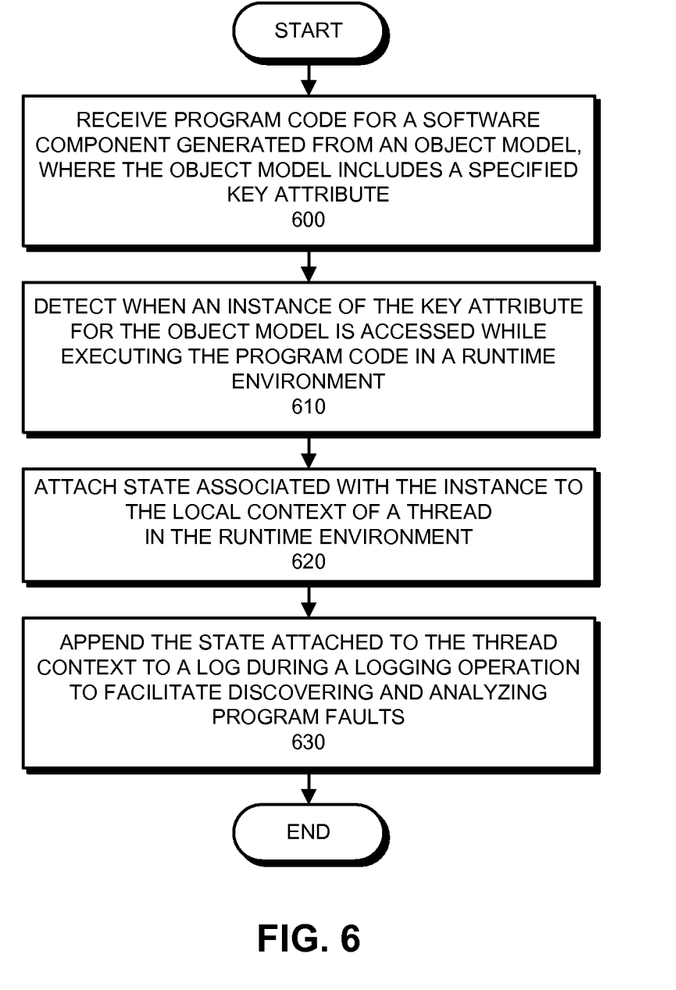
FIG. 6 presents a flow chart illustrating the process of facilitating diagnostic logging for software components in accordance with an embodiment of the present invention.

FIG. 6 presents a flow chart illustrating the process of facilitating diagnostic logging for software components. During operation, the system receives program code for a software component generated from an object model (as described in FIG. 5), where the object model includes a specified key attribute (operation 600). The system detects accesses to any instances of the key attribute for the object model while executing the program code in a runtime environment (operation 610). If such an access is detected, the system attaches state associated with the instance to the local context of a thread in the runtime environment (operation 620). During logging operations, the system appends the state attached to the thread context to a log, thereby providing additional context information in the log and facilitating the discovery and analysis of program faults (operation 630).

Figure 7:
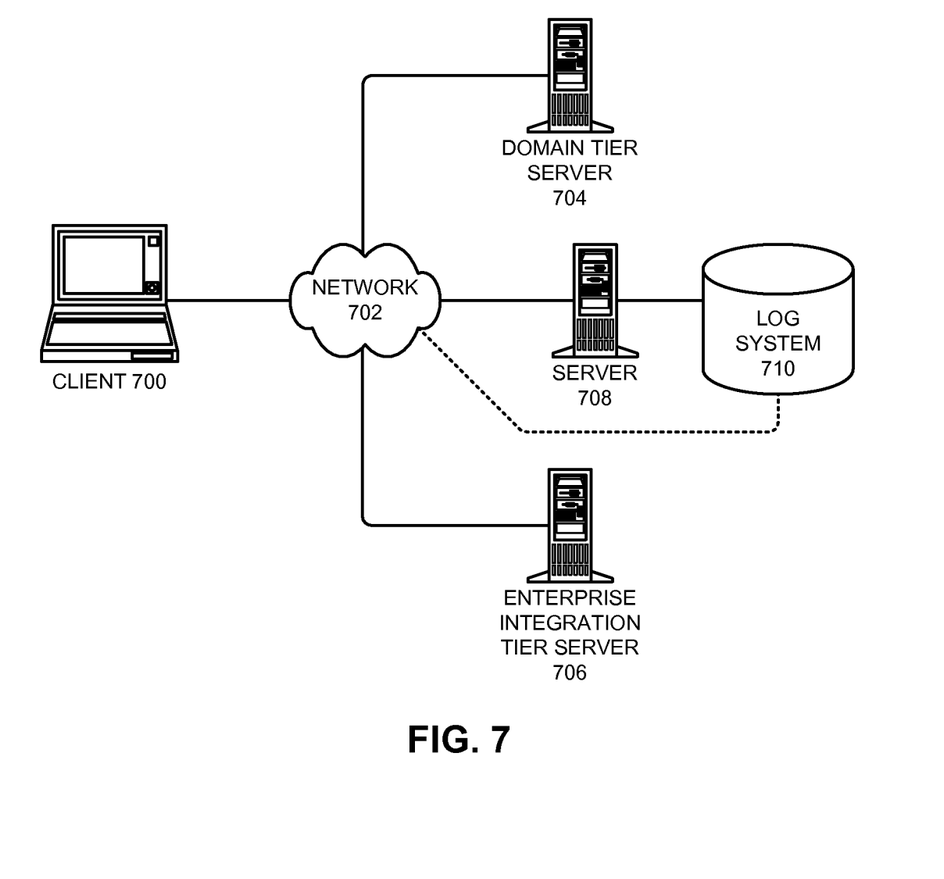
FIG. 7 illustrates an exemplary distributed execution environment for the application transaction described in FIG. 2B in accordance with an embodiment of the present invention.

FIG. 7 illustrates an exemplary distributed execution environment for the application transaction described in FIG. 3B. In FIG. 7, the client tier software component executes on client system 700, which submits the request over network 702 to domain tier server 704. Domain tier server 704 formulates and sends a query to enterprise integration tier server 706. Note that data for log 306 can be stored and routed using a wide variety of techniques. For instance, log writes may be: routed to a database log system 710, either via a server 708 or a direct network connection; written directly to a file; or written to a specialized structure, such as a Java™ Messaging Service (JMS) queue.

Mining Log Data

In one embodiment of the present invention, enacting policy decisions from a modeling environment can be used to target problems typically seen in hosted data centers. For instance, model developers can specify key attributes to log data they anticipate will be useful to support engineers when problems arise. Such techniques enable customer support to find specific issues for given customers, track faults more generally, and trap issues before they become catastrophic failures.

However, logs generated by such techniques may be very large, for instance spanning gigabytes, terabytes, or even larger sets of data in rotation. Support engineers need to be able to quickly sift through this data to identify a transaction associated with a given customer having a problem. Support engineers also need to be able to sequence thought a set of function calls related to customer requests, in order to determine whether a larger problem exists that may be affecting the system.

In one embodiment of the present invention, the system data-mines and analyzes the automatically-generated logs of model state and execution traces to present the logged information in a format that can be easily filtered and/or browsed (e.g., using key values for key attributes) and to determine system state. For instance, the system can: (1) data-mine the data in the logs; (2) use the mined data to build a parse tree of state information for the trace data logged for different software components in the system; (3) compare the parse tree(s) against a knowledgebase of known patterns that are indicative of "healthy" operation, faults, and failures; and (4) alert support staff before a fault escalates into a failure. Such capabilities simplify the mechanics of determining a problematic sequence of calls, and enable support engineers to zoom in on problem areas in the log to get additional details.

In one embodiment of the present invention, the logging infrastructure may include multiple levels of granularity. For instance, a model developer may be able to specify different levels of importance to items in the object model. Alternatively, the developer may only specify one class of key attributes in the object model.

In summary, embodiments of the present invention use key attributes specified in an object model to automatically generate program code for diagnostic logging. A model developer indicates such key attributes, and the system then automatically generates logging code that logs rich context state during existing log events. Consistent enterprise-wide logging is performed based on high-level models for software components, forming an integrated logging solution that does not require software developers to explicitly log any information and does not require logging uniformity to be enforced across the development process of multiple software components. Hence, the described system facilitates increased developer productivity while increasing the availability of log data and improving product supportability.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates diagnostic logging for software components, comprising:
   specifying a key attribute in an object model by using an annotation to flag the key attribute, wherein the object model is described in a standardized modeling language;
   compiling the object model to obtain source code, wherein said compiling comprises generating:
      logging code in all methods of the source code where the key attribute is accessed or modified, wherein the logging code writes current state and execution trace information;
   compiling the source code to obtain executable instructions;
   executing the executable instructions in a runtime environment; and
   appending the state and execution trace information generated by the logging code to a log to facilitate discovering and analyzing program faults.

2. The method of claim 1, wherein the logging operation is triggered by one or more of the following:
   a developer-initiated call to a logging function; and
   an entry point into an identified key service.

3. The method of claim 1,
   wherein multiple software components are developed simultaneously and independently for an integrated product, where key attributes are specified in an object model for each software component;
   wherein states associated with specified instances of key attributes in the multiple software components are automatically attached to the thread context and written to the log during program execution;
   wherein the method is used to facilitate seamless, integrated logging of state for the integrated product during program execution.

4. The method of claim 1, wherein the key attribute identifies a key object and/or a key behavior for the object model.

5. The method of claim 1, wherein the method further involves using the log to detect program faults and/or program anomalies and to detect impending program failures.

6. The method of claim 5, wherein the method further involves parsing the log to find patterns that are indicative of healthy state, faults, and/or failures.

7. The method of claim 1, wherein the runtime environment is a distributed runtime environment that spans multiple computers, networks, and/or software components.

8. A non-transitory computer-readable storage medium storing instructions that when executed by a computer cause the computer to perform a method that facilitates diagnostic logging for software components, the method comprising:
   specifying a key attribute in an object model by using an annotation to flag the key attribute, wherein the object model is described in a standardized modeling language;
   compiling the object model to obtain source code, wherein said compiling comprises generating:
      logging code in all methods of the source code where the key attribute is accessed or modified, wherein the logging code writes current state and execution trace information;
   compiling the source code to obtain executable instructions;
   executing the executable instructions in a runtime environment; and
   appending the state and execution trace information generated by the logging code to a log to facilitate discovering and analyzing program faults.

9. The computer-readable storage medium of claim 8, wherein the logging operation is triggered by one or more of the following:
   a developer-initiated call to a log function; and
   an entry point into an identified key service.

10. The computer-readable storage medium of claim 8,
    wherein multiple software components are developed simultaneously and independently for an integrated product, where key attributes are specified in an object model for each software component;
    wherein states associated with specified instances of key attributes in the multiple software components are automatically attached to the thread context and written to the log during program execution;
    wherein the method is used to facilitate seamless, integrated logging of state for the integrated product during program execution.

11. The computer-readable storage medium of claim 8, wherein the key attribute identifies a key object and/or a key behavior for the object model.

12. The computer-readable storage medium of claim 8, wherein the runtime environment is a distributed runtime environment that spans multiple computers, networks, and/or software components.

13. An apparatus that facilitates diagnostic logging for software components, comprising:
    a specifying mechanism configured to specify a key attribute by using an annotation to flag the key attribute in an object model, wherein the object model is described in a standardized modeling language;
    a compiling mechanism configured to compile the object model to obtain source code, wherein said compiling comprises generating:
       logging code in all methods of the source code where the key attribute is accessed or modified, wherein the logging code writes current state and execution trace information;
    wherein the compiling mechanism is further configured to compile the source code to obtain executable instructions;
    an executing mechanism configured to execute the executable instructions in a runtime environment; and
    an appending mechanism configured to append the state and execution trace information generated by the logging code to a log to facilitate discovering and analyzing program faults.

* * * * *